United States Patent
Phillips et al.

(10) Patent No.: US 6,543,565 B1
(45) Date of Patent: Apr. 8, 2003

(54) METHOD AND SYSTEM FOR COLLECTING REGENERATIVE BRAKING ENERGY IN A PARALLEL HYBRID ELECTRIC VEHICLE

(75) Inventors: Anthony Mark Phillips, Northville, MI (US); Miroslava Jankovic, Birmingham, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/709,607

(22) Filed: Nov. 10, 2000

(51) Int. Cl.[7] ............ B60K 13/04; B62M 1/10
(52) U.S. Cl. ............ 180/165; 180/65.4; 180/65.2; 180/65.3
(58) Field of Search .............. 180/165, 65.2, 180/65.4, 65.3, 65.7; 188/173, 171, 329, 330; 303/152, 15, 3, 20; 290/40 C; 701/93, 70, 71; 74/866, 865, 867, 22

(56) References Cited

U.S. PATENT DOCUMENTS

| | | | | |
|---|---|---|---|---|
| 4,855,914 A | * | 8/1989 | Davis et al. | 74/866 |
| 5,915,801 A | | 6/1999 | Taga et al. | |
| 6,033,042 A | * | 3/2000 | Klemen | 303/152 |
| 6,054,844 A | * | 4/2000 | Frank | 180/65.2 |
| 6,057,605 A | * | 5/2000 | Bourne et al. | 290/40 C |
| 6,116,363 A | * | 9/2000 | Frank | 180/65.2 |
| 6,155,365 A | * | 12/2000 | Boberg | 180/65.2 |
| 6,275,763 B1 | * | 8/2001 | Lotito et al. | 701/71 |
| 6,278,916 B1 | * | 8/2001 | Crombez | 701/22 |
| 6,295,500 B1 | * | 9/2001 | Cullen et al. | 701/93 |
| 6,321,144 B1 | * | 11/2001 | Crombez | 303/152 |

FOREIGN PATENT DOCUMENTS

| | | | | |
|---|---|---|---|---|
| GB | 2184075 | * | 6/1987 | 280/65.2 |
| JP | 2000134713 | | 5/2000 | |

* cited by examiner

Primary Examiner—Brian L. Johnson
Assistant Examiner—Hau Phan
(74) Attorney, Agent, or Firm—Brooks & Kushman; Carlos Hanze

(57) ABSTRACT

A regenerative brake control method and system for a hybrid electric vehicle (HEV) with a disconnect clutch separating the engine from the motor. When the engine is disconnected from the HEV powertrain, more regenerative braking energy is possible because the negative powertrain torque of the engine's friction and pumping is eliminated. The control can determine when to disconnect and reconnect the engine to the powertrain using, for example, driver demand, vehicle speed, accelerator position, brake pedal position, engine state, motor state, and motor fault status. The control also minimizes powertrain disturbance to improve vehicle drivability by continuously adjusting the amount of regenerative braking to correspond to the changing torque of the engine on the powertrain during disconnect or reconnect.

20 Claims, 1 Drawing Sheet

METHOD AND SYSTEM FOR COLLECTING REGENERATIVE BRAKING ENERGY IN A PARALLEL HYBRID ELECTRIC VEHICLE

BACKGROUND OF THE INVENTION

1. Field of Invention

The present invention relates generally to a hybrid electric vehicle, and specifically to a method and system to optimize collecting regenerative braking energy in a parallel hybrid electric vehicle (HEV) while minimizing torque disturbance to the powertrain.

2. Discussion of the Prior Art

The need to reduce fossil fuel consumption and pollutants from automobiles and other vehicles powered by an internal combustion engines (ICE's) is well known. Vehicles powered by electric motors have attempted to address these needs. However, electric vehicles have limited range and limited power coupled with the substantial time needed to recharge their batteries. An alternative solution is to combine both an ICE and electric traction motor into one vehicle. Such vehicles are typically called hybrid electric vehicles (HEV's). See generally, U.S. Pat. No. 5,343,970 (Severinsky).

The HEV has been described in a variety of configurations. Many HEV patents disclose systems where an operator is required to select between electric and internal combustion operation. In other configurations the electric motor drives one set of wheels and the ICE drives a different set.

Other, more useful, configurations have developed. A series hybrid electric vehicle (SHEV) is a vehicle with an engine (most typically an ICE) which powers a generator. The generator, in turn, provides electricity for a battery and motor coupled to the drive wheels of the vehicle. There is no mechanical connection between the engine and the drive wheels. A parallel hybrid electrical vehicle (PHEV) is a vehicle with an engine (most typically an ICE), battery, and electric motor combined to provide torque to power the wheels of the vehicle.

A parallel/series hybrid electric vehicle (PSHEV) has characteristics of both the PHEV and the SHEV. The PSHEV is also known as a torque (or power) splitting powertrain configuration. Here, the torque output of the engine is given in part to the drive wheels and in part to an electrical generator. The generator powers a battery and motor that also provide torque output. In this configuration, torque output can come from either source or both simultaneously. The vehicle braking system can even deliver torque to drive the generator to produce charge to the battery.

The desirability of combining the ICE with an electric motor is clear. The ICE's fuel consumption and pollutants are reduced with no appreciable loss of performance or range of the vehicle. Nevertheless, there remains substantial room for development of ways to optimize the HEV's operational parameters. Two such areas of development are engine start/stop and regenerative braking. Engine start/stop strategies turn off the engine during times of low power demand from the driver, thereby reducing fuel usage and emission production directly.

Regenerative braking (regen) captures the kinetic energy of the vehicle as it decelerates. In conventional vehicles, kinetic energy is usually dissipated as heat at the vehicle's brakes or engine during deceleration. Regen converts the captured kinetic energy through a generator into electrical energy in the form of a stored charge in the vehicle's battery. This stored energy is used later to power the electric motor. Consequently, regen also reduces fuel usage and emission production. In certain vehicle configurations, the engine can be disconnected from the rest of the powertrain thereby allowing more of the kinetic energy to be converted into stored electrical energy.

Successful implementation of an efficient regen strategy must consider, among other things, the effects of ICE braking on the vehicle. In conventional vehicles, engine braking is well known and is typically characterized by two types of negative powertrain torques including engine friction and pumping losses. Both types of losses result from the engine being driven by the wheels through the powertrain. Engine friction losses result from the piston rings sliding along the cylinder walls and rotation in the bearings of the engine. Engine pumping refers to the compression of the air in each of the engine's cylinders as the engine moves through its stroke. Engine braking allows the driver to reduce vehicle speed without applying force to the brake pedal.

Regenerative braking (regen) is known for conventional ICE vehicles in the prior art. A primitive regen system is described in U.S. Pat. No. 5,086,865 to Tanaka, et. al. In Tanaka, a regen controller decouples the engine from the vehicle's powertrain. Based on vehicle speed and gear selection, an electromagnetic clutch couples the powertrain to a hydraulic pump/motor whereby the vehicle's kinetic energy is transferred to a high pressure oil accumulator. The pressure can be transferred back to the powertrain during, for example, the next acceleration of the vehicle.

Regen in an HEV is also known in the prior art. In U.S. Pat. No. 5,839,533 to Mikami, et. al., a rapid response drive source brake controller for engine braking and regen is described. The Mikami controller determines the gearshift lever position manually set by the driver (e.g., low gear). The engine's brake force (negative torque) increases as the speed ratio of an automatic transmission increases. The controller can engage both engine braking and regenerative braking if the manually selected braking exceeds the maximum regen force that can be generated by the electric generator.

Taga, et. al., U.S. Pat. No. 5,915,801, discloses a regen controller to simulate ICE braking torque. This controller disengages the engine from the powertrain via a disconnect clutch and accumulates braking energy (negative torque) in an on-board accumulator such as a generator and battery. The Taga controller improves the speed and efficiency of the regen by, for example, determining the target braking torque according to the release speed of the accelerator pedal. Thus, when large braking torque is required, the controller makes it possible to produce a large amount of regen without delay even before the brake pedal is depressed. This decreases the need for the driver to operate the manual shift lever to a lower gear or further depress the brake pedal. The controller can additionally use input from brake pedal position, vehicle speed, vehicle weight, and gradient information to determine target braking torque.

Using the Taga controller during regen, the engine may or may not be connected to the powertrain. If the engine is disconnected during regen, there is no engine friction and pumping. This allows the recapture of even more kinetic energy without exceeding the deceleration limits for the vehicle. Obviously this is advantageous for an HEV from an energy management perspective.

The tradeoff for disconnecting the engine to capture more regen energy is that with the engine disconnected, the transition back to an engine driving state becomes significantly more complex. If the engine is left connected during regen and the driver depresses the accelerator pedal, it is a straightforward process to restart the engine, if desired, simply by reinitializing fueling of the engine. Any torque disturbance to the powertrain due to the engine restarting would be small, and not completely unexpected by the driver, given the change in demand. Alternatively, if the engine is disconnected from the powertrain during regen, starting the engine would involve maintaining the vehicle's response to the driver's demand using the motor while simultaneously closing the disconnect clutch and starting the engine.

Torque supply to the powertrain should be transferred from the motor to the engine smoothly in order to avoid any disturbance to the driver. Nevertheless, the Taga patent, while attempting to simulate engine braking and improve vehicle drivability, does not address the common situation where a driver suddenly changes from decelerating to accelerating. It is therefore necessary to develop a strategy to keep the engine connected to the powertrain during regen if a change in driver demand (from decelerating to accelerating) is anticipated. With two modes of regen possible, it will also be necessary to transition the compression braking torque from the engine to the motor as the engine is disconnected from the powertrain in going from one mode to the other.

SUMMARY OF THE INVENTION

The present invention provides a method and system for controlling regenerative braking energy in a parallel hybrid electric vehicle. The controller: (1) determines a target braking torque based on a basic quantity which is at least one of, a driver demand and a vehicle operating status, (2) determines whether to disconnect an engine connector to a vehicle powertrain, and (3) controls a resultant increasing regenerative braking torque during an engine disconnect to minimize powertrain disturbance. Driver demand can be determined using brake pedal position and accelerator position. Operating status can include engine on status, motor fault condition, battery state of charge, transmission gear, transmission shift status, battery current sink capability and vehicle speed.

The controller also determines whether to disconnect the connecting means of the engine to the vehicle powertrain, whereby increased regenerative braking energy can be collected, and similarly controls the resultant increasing regenerative braking torque during engine reconnect to minimize powertrain disturbance. Engine disconnect factors could include determining whether a predetermined vehicle speed has been reached, whether the driver demand (e.g., brake pedal position and accelerator pedal position) indicates lower expected power demand, and whether a fault condition exists in a vehicle motor.

An important feature of this invention is that the controller minimizes powertrain disturbance during the disconnecting of the engine from the powertrain. This is accomplished by continuously adjusting the amount of regenerative braking to correspond to the changing torque of the engine on the powertrain during disconnect.

DETAILED DESCRIPTION OF PREFERRED EMBODIMENT

The present invention generally relates to hybrid electric vehicles (HEVs). Although the preferred embodiment described is for a parallel HEV, the invention could be applied to any vehicle using a motor and an engine as the drive source having an engine disconnect clutch.

Figure 1:
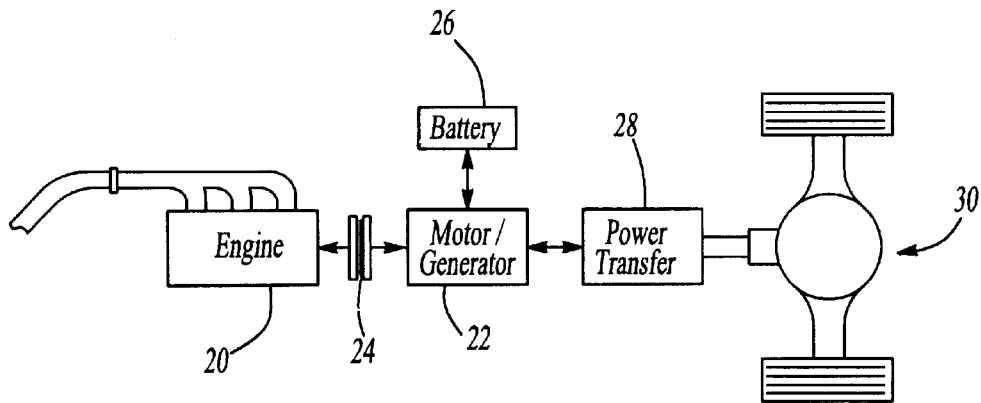
FIG. 1 is a partially schematic representation of a hybrid electric vehicle in which regenerative braking energy may be collected.

FIG. 1 shows general components of a parallel HEV powertrain with an engine disconnect clutch. An engine 20, is linked to a motor/generator 22, via a disconnect clutch 24. A battery 26 connects to the motor/generator 22 to allow the flow of electrical current to and from the two components. The motor/generator 22 is connected to a powertrain (power transfer unit) 28, such as a transmission or driveshaft, which is connected to the vehicle's wheels 30. Thus, torque energy flows from the engine 20 and motor/generator 22 through the power transfer unit 28 to the wheels 30.

Figure 2:
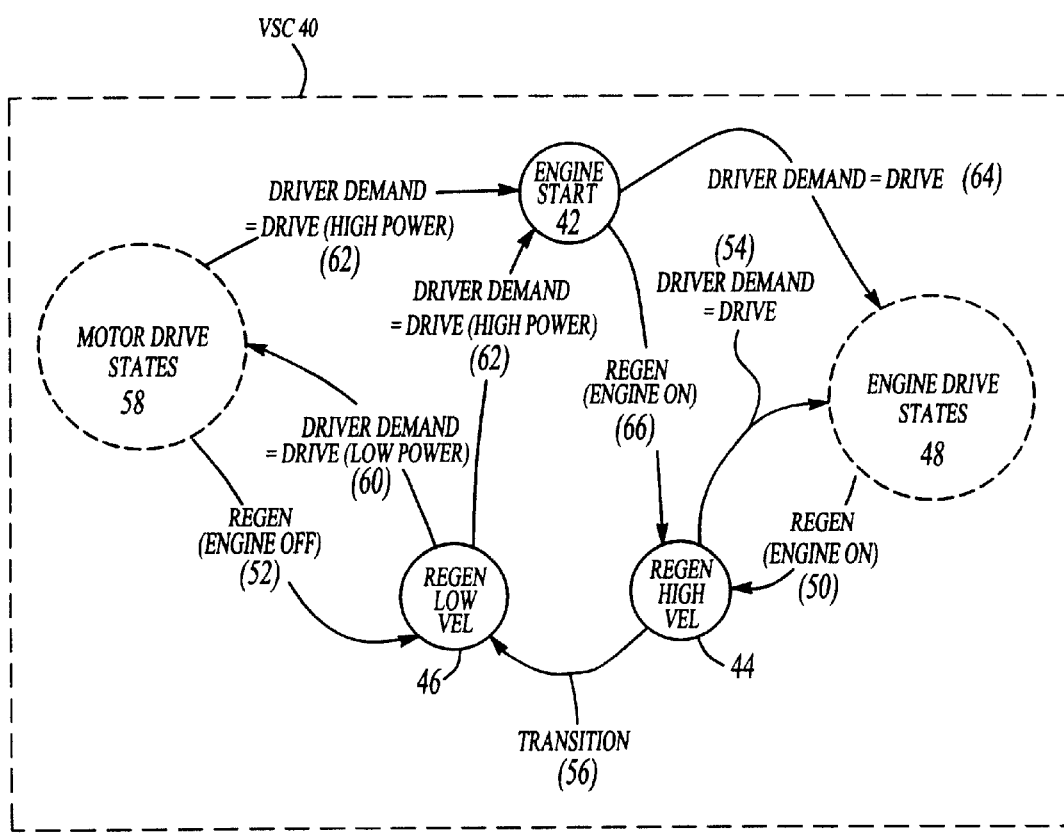
FIG. 2 is a flow chart illustrating various steps of a method in accordance with the present invention.

Since the engine 20 can be disconnected from the motor/generator 22 and power transfer unit 28, there are two potential drive states for the regen. The present invention establishes a strategy to determine whether to acquire more regenerative energy (engine disconnected) or to allow quick driver changes of demand (engine connected). This two-state strategy is shown in FIG. 2. In FIG. 2, MOTOR DRIVE states 58 represents all of the (non-regen) states in the vehicle for which the disconnect clutch is disconnected. ENGINE DRIVE states 48 represents all of the (non-regen) states for which the disconnect clutch is connected.

If a vehicle system controller (VSC) 40 requests regen (based on driver demand and vehicle operating status), either a first regenerative braking state, or a REGEN HIGH VEL state 44, or a second regenerative braking state, or REGEN LOW VEL state 46, will be reached, depending on a previous state of the VSC 40. Various variables of vehicle operating status are possible. These can include: vehicle speed, engine-on status, motor/generator fault condition, battery state-of-charge, battery sink capability—i.e., the ability of the battery to absorb additional charge, and the power transfer unit component status—e.g., transmission gear and transmission shift.

If the VSC 40 is in one of the ENGINE DRIVE states 48 and the transition conditions represented by REGEN (ENGINE ON) 50 are satisfied, the VSC 40 will transition to a REGEN HIGH VEL state 44. In this state, the disconnect clutch 24 remains closed, keeping the engine 20 connected to the motor/generator 22 and power transfer unit 28. In this state, regenerative braking torque commanded to the motor/generator 22 by the VSC 40 is reduced by the amount of the braking toque delivered to the power transfer unit 28 by the engine 20. Conversely, if the VSC 40 is in one of the MOTOR DRIVE states 58 and the transition conditions represented by REGEN (ENGINE OFF) 52 are satisfied, the VSC 40 will transition to the REGEN LOW VEL state 46. In this state, the disconnect clutch 24 remains open, keeping the engine 20 disconnected from the motor/generator 22 and power transfer unit 28. In this state, full regenerative braking torque can be commanded to the powertrain because there is no need to account for engine braking. In short, when the VSC 40 first enters a regen mode, if the engine 20 is connected to the powertrain through the disconnect clutch 24, it remains connected (initially) when the regen mode is entered.

Once in REGEN HIGH VEL state 44, the VSC 40 can transition back to one of the ENGINE DRIVE states 48 if requested by a change in driver demand, DRIVER DEMAND=DRIVE 54, by simply fueling the engine 20 appropriately and eliminating a regen torque command to the motor/generator 22. This is easily accomplished since the disconnect clutch 24 is already closed, keeping the engine 20 connected to the powertrain.

The transition from REGEN HIGH VEL state 44 to REGEN LOW VEL state 46 is based on vehicle speed and the motor/generator 22 status. A transition 56 is allowed once the vehicle speed falls below a calibratable value, assuming that the motor/generator 22 is not in a fault condition (which could prevent it from being used to restart the engine). A more sophisticated strategy for the transition 56 condition might also incorporate a vehicle's brake pedal pressure or position as an indicator of the likelihood that the driver might change powertrain torque demand.

The strategy also accounts for transitions into and out of the MOTOR DRIVE states 58. If the vehicle is in one of the MOTOR DRIVE states 58, (i.e., engine 20 not connected or running), only the REGEN LOW VEL 46 mode can be entered directly. Once in REGEN LOW VEL state 46, the system can transition back to one of the MOTOR DRIVE states 58 if the driver demands a relatively low level of positive torque to the wheels, DRIVER DEMAND=DRIVE (LOW POWER) 60. In the case of a high level of torque demand to the wheels, DRIVER DEMAND=DRIVE (HIGH POWER) 62, the system would initiate an ENGINE START state 42 event and then would transition to an ENGINE DRIVE state 48 assuming that the transition condition, DRIVER DEMAND=DRIVE 64, is satisfied. In no instance would a transition directly from REGEN LOW VEL state 46 to REGEN HIGH VEL state 44 be allowed without first starting the engine 20. If the driver demand changed while the VSC 40 was in the ENGINE START state 42, a transition REGEN (ENGINE ON) 66 to REGEN HIGH VEL state 44 would be allowed once and ENGINE START state 42 event was completed.

The total amount of available drive source braking torque (deceleration) (at the motor/generator 22) is specified in a calibratable table and is dependent on several factors including current gear ratio, vehicle speed, brake pressure, motor/generator 22 capability, and motor/generator 22 speed. Levels are calibrated to achieve desired performance feel during deceleration (either braking or coasting). In the REGEN HIGH VEL state 44 (disconnect clutch 24 connected), the total level of drive source braking torque commanded to the motor/generator 22 must be reduced by the amount of negative drive source torque from the engine's 20 friction and pumping:

$$\tau_{mot\text{---}cmd} = \tau_{tot} - \tau_{eng},$$

where $\tau_{mot\text{---}cmd}$ is the commanded regen torque to the motor/generator 22, $\tau_{tot}$ is the calibrated torque (total allowable depending on the current vehicle operating conditions), and $\tau_{eng}$ is the engine friction and pumping torque.

In the REGEN LOW VEL state 46, the output command is more complicated. When the state is first entered, the disconnect clutch 24 is still engaged so the engine 20 is still providing negative torque to the powertrain from pumping and friction. Within the state, the disconnect clutch 24 is commanded to open, which reduces negative torque on the motor/generator 22 and power transfer unit 28 (powertrain). To avoid a noticeable powertrain disturbance, this reduction of negative engine 20 torque is replaced with equal increases in regen torque from the motor/generator 22, even during the transition. This is accomplished by increasing the negative torque commanded to the motor/generator 22 according to an estimated amount of the reduction in the torque being passed through the disconnect clutch 24 from the engine 20.

There are several ways to estimate the amount of torque reduction from the engine 20. One method uses the relative position of the clutch plates. The formula for the motor/generator 22 torque command for this method is:

$$\tau_{mot\text{---}cmd} = \tau_{tot} - \lambda(X_c)\tau_{eng},$$

where $\lambda(X_c)$ is the percent fully closed of the disconnect clutch 24 and is given by:

$$\lambda(x_c) = 1 - \frac{x_c - x_{fc}}{x_{fo} - x_{fc}}$$

where $X_c$ is the position of a disconnect clutch plate, $X_{fc}$ is the fully closed position of the plate, and $X_{fo}$ is the fully open position of the plate. In the formula above, $\lambda(X_c)$ is a linear function of $X_c$. In general, for alternative implementations, other more general nonlinear functions might better represent the relationship between clutch plate position and percent torque passed through the clutch. Although the algorithm above uses clutch plate position to determine the percent of engine friction and pumping torque that the clutch is passing to the powertrain, alternative algorithms could use other measures to determine this value. One obvious alternative choice would use disconnect clutch 24 apply pressure. During clutch apply, the amount of torque passed through the clutch is a function of this pressure. In other words, $$\tau_{cl} = f(p_{cl}).$$

In this case, the motor/generator 22 torque command would be calculated according to:

$$\tau_{mot\text{---}cmd} = \tau_{tot} - \tau_{cl},$$

where $\tau_{cl}$ is the signal from the disconnect clutch 24 measured by cylinder pressure.

We claim:

1. A method of controlling regenerative braking energy in a vehicle having an engine and a motor, the method comprising:

transitioning the vehicle from a non-regenerative braking state to a first regenerative braking state when a vehicle system controller requests a regenerative braking state and the engine is connected to the motor;

transitioning the vehicle from a non-regenerative braking state to a second regenerative braking state when the vehicle system controller requests a regenerative braking state and the engine is disconnected from the motor;

determining whether to transition the vehicle from the first regenerative braking state to the second regenerative braking state after the vehicle is transitioned to the first regenerative braking state from a non-regenerative braking state; and controlling regenerative braking to minimize powertrain disturbance during a transition from the first regenerative braking state to the second regenerative braking state after determining to transition the vehicle from the first regenerative braking state to the second regenerative braking state.

2. The method of claim 1, wherein transitioning the vehicle from the first regenerative braking state to the second regenerative braking state comprises disconnecting the engine from the motor by disconnecting a clutch, the clutch being configured to at least connect the engine to, and disconnect the engine from, the motor.

3. The method of claim 2, wherein controlling regenerative braking to minimize powertrain disturbance during the transition from the first regenerative braking state to the second regenerative braking state comprises increasing braking torque from the motor during the engine disconnect, the increase in braking torque from the motor being based on a braking torque reduction from the engine.

4. The method of claim 3, wherein increasing braking torque from the motor during the engine disconnect comprises estimating the braking torque reduction from the engine based on the position of clutch plates in the clutch.

5. The method of claim 3, wherein increasing braking torque from the motor during engine disconnect comprises estimating the braking torque reduction from the engine based on apply pressure of the clutch.

6. The method of claim 1, further comprising decreasing braking torque from the motor based on braking torque from the engine when the vehicle is in the first regenerative braking state.

7. The method of claim 1, wherein the vehicle system controller requests a regenerative braking state based on driver demand and at least one vehicle operating status variable.

8. The method of claim 7, wherein the at least one vehicle operating status variable includes: vehicle speed, engine-on status, motor/generator fault condition, battery state-of-charge, battery sink capability, and power transfer unit component status.

9. The method of claim 1, wherein determining whether to transition the vehicle from the first regenerative braking state to the second regenerative braking state comprises comparing vehicle speed to a calibratable value, and determining a motor fault condition.

10. A method of controlling regenerative braking energy in a vehicle having an engine and a motor, the method comprising:

transitioning the vehicle from a non-regenerative braking state to a first regenerative braking state when a vehicle system controller requests a regenerative braking state and the engine is connected to the motor;

transitioning the vehicle from a non-regenerative braking state to a second regenerative braking state when the vehicle system controller requests a regenerative braking state and the engine is disconnected from the motor;

determining whether to transition the vehicle from the first regenerative braking state to the second regenerative braking state after the vehicle is transitioned to the first regenerative braking state from a non-regenerative braking state;

disconnecting the engine from the motor when a determination is made to transition the vehicle from the first regenerative braking state to the second regenerative braking state; and increasing braking torque from the motor when the engine is being disconnected from the motor during a transition from the first regenerative braking state to the second regenerative braking state, the increase in braking torque being based on a braking torque reduction from the engine.

11. The method of claim 10, wherein disconnecting the engine from the motor when a determination is made to transition the vehicle from the first regenerative braking state to the second regenerative braking state comprises disconnecting a clutch, the clutch being configured to at least connect the engine to, and disconnect the engine from, the motor.

12. The method of claim 11, wherein increasing braking torque from the motor during the engine disconnect comprises estimating the braking torque reduction from the engine based on the position of clutch plates in the clutch.

13. The method of claim 11, wherein increasing braking torque from the motor during engine disconnect comprises estimating the braking torque reduction from the engine based on apply pressure of the clutch.

14. The method of claim 10, further comprising decreasing braking torque from the motor based on braking torque from the engine when the vehicle is in the first regenerative braking state.

15. The method of claim 10, wherein the vehicle system controller requests a regenerative braking state based on driver demand and at least one vehicle operating status variable.

16. The method of claim 15, wherein the at least one vehicle operating status variable includes: vehicle speed, engine-on status, motor/generator fault condition, battery state-of-charge, battery sink capability, and power transfer unit component status.

17. The method of claim 10, wherein determining whether to transition the vehicle from the first regenerative braking state to the second regenerative braking state comprises comparing vehicle speed to a calibratable value, and determining a motor fault condition.

18. A method of controlling regenerative braking energy in a vehicle having an engine and a motor, the engine being connected to the motor with a disconnect clutch, the method comprising:

transitioning the vehicle from a non-regenerative braking state to a first regenerative braking state when a vehicle system controller requests a regenerative braking state and the disconnect clutch is closed;

transitioning the vehicle from a non-regenerative braking state to a second regenerative braking state when the vehicle system controller requests a regenerative braking state and the disconnect clutch is open;

determining whether to transition the vehicle from the first regenerative braking state to the second regenerative braking state after the vehicle is transitioned to the first regenerative braking state from a non-regenerative braking state;

opening the disconnect clutch when a determination is made to transition the vehicle from the first regenerative braking state to the second regenerative braking state; and increasing braking torque from the motor when the disconnect clutch is being opened during a transition from the first regenerative braking state to the second regenerative braking state, the increase in braking torque being based on a braking torque reduction from the engine.

19. The method of claim 18, wherein increasing braking torque from the motor when the disconnect clutch is being opened, comprises estimating the braking torque reduction from the engine based on the position of clutch plates in the clutch.

20. The method of claim 18, wherein increasing braking torque from the motor when the disconnect clutch is being opened, comprises estimating the braking torque reduction from the engine based on apply pressure of the clutch.

* * * * *

UNITED STATES PATENT AND TRADEMARK OFFICE
CERTIFICATE OF CORRECTION

PATENT NO. : 6,543,565 B1
DATED : April 8, 2003
INVENTOR(S) : Phillips et al.

It is certified that error appears in the above-identified patent and that said Letters Patent is hereby corrected as shown below:

<u>Title page,</u>
Item [56], U.S. PATENT DOCUMENTS, insert -- 6,364,807  4/2002  Koneda et al. --

Signed and Sealed this

Fifth Day of August, 2003

JAMES E. ROGAN
*Director of the United States Patent and Trademark Office*